US007918991B2

(12) United States Patent
Ziebarth et al.

(10) Patent No.: US 7,918,991 B2
(45) Date of Patent: Apr. 5, 2011

(54) COMPOSITIONS AND PROCESSES FOR REDUCING NOX EMISSIONS DURING FLUID CATALYTIC CRACKING

(75) Inventors: Michael Scott Ziebarth, Columbia, MD (US); M. Sundaram Krishnamoorthy, Columbia, MD (US); Roger Jean Lussier, Ellicott City, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 269 days.

(21) Appl. No.: 11/918,086

(22) PCT Filed: Mar. 24, 2006

(86) PCT No.: PCT/US2006/010843
§ 371 (c)(1),
(2), (4) Date: Oct. 8, 2007

(87) PCT Pub. No.: WO2006/115665
PCT Pub. Date: Nov. 2, 2006

(65) Prior Publication Data
US 2009/0057199 A1 Mar. 5, 2009

Related U.S. Application Data

(63) Continuation of application No. 10/909,706, filed on Aug. 2, 2004, and a continuation of application No. 10/909,709, filed on Aug. 2, 2004, now abandoned.

(60) Provisional application No. 60/635,150, filed on Apr. 27, 2005.

(51) Int. Cl.
*C10G 11/05* (2006.01)
(52) U.S. Cl. ......... 208/120.01; 208/120.25; 208/120.35; 502/74; 502/79
(58) Field of Classification Search .................. 208/113, 208/118, 119, 121, 120.01, 120.25, 120.35; 502/74, 77, 78, 79
See application file for complete search history.

(56) References Cited

U.S. PATENT DOCUMENTS

| | | | | |
|---|---|---|---|---|
| 2,892,801 | A | 6/1959 | Sargent | 252/474 |
| 3,036,973 | A | 5/1962 | Nathan et al. | 252/474 |
| 3,129,252 | A | 4/1964 | Graham et al. | 260/637 |
| 3,184,417 | A | 5/1965 | Hort | 252/474 |
| 3,364,136 | A | 1/1968 | Chen et al. | 208/120 |
| 3,617,488 | A | 11/1971 | Csicsery | 208/59 |
| 3,634,140 | A | 1/1972 | Krusenstierna | 136/86 B |
| 3,804,780 | A | 4/1974 | Wilson et al. | 252/455 Z |
| 3,894,940 | A | 7/1975 | Scherzer et al. | 208/120 |
| 4,170,571 | A | 10/1979 | Ritscher | 252/455 Z |
| 4,199,435 | A | 4/1980 | Chessmore et al. | 208/113 |
| 4,290,878 | A | 9/1981 | Blanton, Jr. | 208/120 |
| 4,309,279 | A | 1/1982 | Chester et al. | 208/120 |
| 4,368,057 | A | 1/1983 | Matthews | 47/197 |
| 4,377,502 | A | 3/1983 | Klotz | 252/455 Z |
| 4,427,536 | A | 1/1984 | Klaassen et al. | 208/113 |
| 4,428,827 | A | 1/1984 | Hobbs et al. | 208/120 |
| 4,434,147 | A | 2/1984 | Dimpfl et al. | 423/235 |
| 4,469,589 | A | 9/1984 | Yoo et al. | 208/120 |
| 4,471,070 | A | 9/1984 | Siefert et al. | 502/302 |
| 4,472,267 | A | 9/1984 | Yoo et al. | 208/120 |
| 4,472,532 | A | 9/1984 | Mooi | 502/302 |
| 4,473,658 | A | 9/1984 | Schwartz | 502/45 |
| 4,476,245 | A | 10/1984 | Siefert | 502/302 |
| 4,495,304 | A | 1/1985 | Yoo et al. | 502/66 |
| 4,495,305 | A | 1/1985 | Yoo et al. | 502/65 |
| 4,513,091 | A | 4/1985 | Chang et al. | 502/71 |
| 4,521,298 | A | 6/1985 | Rosinski et al. | 208/120 |
| 4,522,937 | A | 6/1985 | Yoo et al. | 502/302 |
| 4,582,815 | A | 4/1986 | Bowes | 502/64 |
| 4,642,178 | A | 2/1987 | Yoo et al. | 208/113 |
| 4,654,316 | A | 3/1987 | Barri et al. | 502/61 |
| 4,708,786 | A | 11/1987 | Occelli | 208/120 |

(Continued)

FOREIGN PATENT DOCUMENTS
EP 0355928 2/1990
(Continued)

OTHER PUBLICATIONS

American Chemical Society Symposium Series, No. 634, "Contaminant-Metal Deactivation and Metal-Dehydrogenation Effects During Cyclic Propylene Steaming of Fluid Catalytic Cracking Catalysts", Ch 12, pp. 171-183 (1996) by L.T. Boock, T.F. Petti, and J.A. Rudesill.
G. W. Young, G.D. Weatherbee, and S.W. Davey, "Simulating Commercial FCCU Yields With The Davison Circulating Riser (DCR) Pilot Plant Unit," National Petroleum Refiners Association (NPRA) Paper AM88-52.
J.S. Magee and M.M. Mitchell, Jr. Eds. Studies in Surface Science and Catalysis vol. 76, Ch 8, pp. 257-292, Elsevier Science Publishers B.V., Amsterdam 1993, ISBN 0-444-89037-8; G.W. Young, "Realistic Assessment of FCC Catalyst Performance in the Laboratory," in Fluid Catalytic Cracking: Science and Technology.
Venuto and Habib, "Fluid Catalytic Cracking with Zeolite Catalysts," Marcel Dekker, New York 1979, ISBN 0-8247-6870-1.
Sadeghbeigi, Fluid Catalytic Cracking Handbook, Gulf Publishing Company, Houston, 1995, ISBN 0-88415-290-1.

*Primary Examiner* — Walter D Griffin
*Assistant Examiner* — Renee Robinson
(74) *Attorney, Agent, or Firm* — Charles A. Cross; Beverly J. Artale

(57) ABSTRACT

Compositions for reduction of $NO_x$ generated during a catalytic cracking process, preferably, a fluid catalytic cracking process, are disclosed. The compositions comprise a fluid catalytic cracking catalyst composition, preferably containing a Y-type zeolite, and a $NO_x$ reducing zeolite having a pore size ranging from about 2 to about 7.2 Angstroms and a $SiO_2$ to $Al_2O_3$ molar ratio of less than about 500 and being stabilized with a metal or metal ion selected from the group consisting of zinc, iron and mixtures thereof. Preferably, the $NO_x$ reducing zeolite particles are bound with an inorganic binder to form a particulate composition. In the alternative, the $NO_x$ reducing zeolite particles are incorporated into the cracking catalyst as an integral component of the catalyst. Compositions in accordance with the invention exhibit improved effectiveness for the reduction of $NO_x$ emissions released from the regenerator of a fluid catalytic cracking unit operating under FCC process conditions without a substantial change in conversion or yield of cracked products. Processes for the use of the compositions are also disclosed.

26 Claims, No Drawings

U.S. PATENT DOCUMENTS

| | | | |
|---|---|---|---|
| 4,728,635 A | 3/1988 | Bhattacharyya | 502/304 |
| 4,735,927 A | 4/1988 | Gerdes | 502/64 |
| 4,744,962 A | 5/1988 | Johnson et al. | 423/235 |
| 4,747,935 A | 5/1988 | Scherzer | 208/120 |
| 4,755,282 A | 7/1988 | Samish et al. | 208/113 |
| 4,758,418 A | 7/1988 | Yoo et al. | 423/244 |
| 4,778,664 A | 10/1988 | Grinstead | 423/235 |
| 4,778,665 A | 10/1988 | Krishnamurthy et al. | 423/239 |
| 4,790,982 A | 12/1988 | Yoo et al. | 423/239 |
| 4,797,266 A | 1/1989 | Evans | 423/328 |
| 4,798,813 A | 1/1989 | Kato | 502/60 |
| 4,810,369 A | 3/1989 | Scherzer | 208/120 |
| 4,812,430 A | 3/1989 | Child | 502/42 |
| 4,812,431 A | 3/1989 | Child | 502/42 |
| 4,818,509 A | 4/1989 | Dwyer et al. | 423/329 |
| 4,826,799 A | 5/1989 | Cheng et al. | 502/301 |
| 4,830,840 A | 5/1989 | Bhattacharyya | 423/239 |
| 4,839,026 A | 6/1989 | Brown et al. | 208/120 |
| 4,853,203 A | 8/1989 | Guth et al. | 423/328 |
| 4,855,115 A | 8/1989 | Imanari | 423/239 |
| 4,880,521 A | 11/1989 | Scherzer | 208/120 |
| 4,889,615 A | 12/1989 | Chin et al. | 208/113 |
| 4,895,994 A | 1/1990 | Cheng et al. | 585/270 |
| 4,898,846 A | 2/1990 | Edwards et al. | 502/67 |
| 4,904,627 A | 2/1990 | Bhattacharyya | 502/63 |
| 4,923,842 A | 5/1990 | Summers | 502/261 |
| 4,946,581 A | 8/1990 | van Broekhoven | 208/120 |
| 4,952,382 A | 8/1990 | van Broekhoven | 423/244 |
| 4,957,718 A | 9/1990 | Yoo et al. | 423/244 |
| 4,957,892 A | 9/1990 | Yoo et al. | 502/63 |
| 4,963,520 A | 10/1990 | Yoo et al. | 502/64 |
| 4,973,399 A | 11/1990 | Green et al. | 208/120 |
| 4,976,847 A | 12/1990 | Maxwell et al. | 208/120 |
| 4,980,052 A | 12/1990 | Green et al. | 208/120 |
| 4,986,897 A | 1/1991 | Chin | 208/113 |
| 4,988,432 A | 1/1991 | Chin | 208/121 |
| 4,988,654 A | 1/1991 | Kennedy et al. | 502/84 |
| 5,002,653 A | 3/1991 | Kennedy et al. | 208/118 |
| 5,002,654 A | 3/1991 | Chin | 208/121 |
| 5,015,362 A | 5/1991 | Chin | 208/113 |
| 5,017,538 A | 5/1991 | Takeshima | 502/64 |
| 5,021,144 A | 6/1991 | Altrichter | 208/113 |
| 5,037,538 A | 8/1991 | Chin et al. | 208/113 |
| 5,041,272 A | 8/1991 | Tamura et al. | 423/239 |
| 5,057,205 A | 10/1991 | Chin | 208/121 |
| 5,069,776 A | 12/1991 | Biswas et al. | 208/120 |
| 5,102,530 A | 4/1992 | Edwards et al. | 208/120 |
| 5,114,691 A | 5/1992 | Pinnavaia et al. | 423/244 |
| 5,114,684 A | 5/1992 | Pinnavaia et al. | 502/406 |
| 5,130,012 A | 7/1992 | Edwards et al. | 208/113 |
| 5,145,815 A | 9/1992 | Zarchy | 502/52 |
| 5,171,553 A | 12/1992 | Li et al. | 423/239 |
| 5,173,278 A | 12/1992 | Marler | 423/239 |
| 5,174,980 A | 12/1992 | Hellring et al. | 423/706 |
| 5,190,736 A | 3/1993 | Hellring et al. | 423/706 |
| 5,206,196 A | 4/1993 | Nakano et al. | 502/73 |
| 5,208,198 A | 5/1993 | Nakano et al. | 502/74 |
| 5,240,690 A | 8/1993 | Tang | 423/236 |
| 5,260,043 A | 11/1993 | Li | 423/239.2 |
| 5,260,240 A | 11/1993 | Guthrie et al. | 502/41 |
| 5,268,089 A | 12/1993 | Avidan et al. | 208/113 |
| 5,270,024 A | 12/1993 | Kasahara | 423/213.2 |
| 5,286,693 A | 2/1994 | Ino et al. | 502/62 |
| 5,294,332 A | 3/1994 | Klotz | 208/120 |
| 5,320,822 A | 6/1994 | Ozin et al. | 423/700 |
| 5,364,517 A | 11/1994 | Dieckmann et al. | 208/121 |
| 5,371,055 A | 12/1994 | Cormier et al. | 502/65 |
| 5,372,706 A | 12/1994 | Buchanan et al. | 208/113 |
| 5,374,409 A | 12/1994 | Kasahara | 423/213.2 |
| 5,374,410 A | 12/1994 | Grasselli et al. | 423/239 |
| 5,382,352 A | 1/1995 | Hansen et al. | 208/121 |
| 5,413,699 A | 5/1995 | Chou | 208/113 |
| 5,413,977 A | 5/1995 | Occelli | 502/68 |
| 5,422,333 A | 6/1995 | Kano et al. | 502/60 |
| 5,427,989 A | 6/1995 | Kanesaka | 502/66 |
| 5,433,933 A | 7/1995 | Eshita et al. | 423/213.2 |
| 5,443,803 A | 8/1995 | Mizuno | 423/213.2 |
| 5,472,677 A | 12/1995 | Farris et al. | 423/239 |
| 5,503,818 A | 4/1996 | Nicolaides et al. | 423/327.1 |
| 5,510,306 A | 4/1996 | Murray | 502/64 |
| 5,543,125 A | 8/1996 | Uchida | 423/239.2 |
| 5,547,648 A | 8/1996 | Buchanan et al. | 423/210 |
| 5,552,129 A | 9/1996 | Farnos et al. | 432/239.2 |
| 5,565,181 A | 10/1996 | Dieckmann et al. | 423/239.1 |
| 5,589,147 A | 12/1996 | Farnos et al. | 423/239.2 |
| 5,599,520 A | 2/1997 | Garces et al. | 423/700 |
| 5,614,453 A | 3/1997 | Occelli | 502/66 |
| 5,627,125 A | 5/1997 | Ebner et al. | 502/331 |
| 5,695,728 A | 12/1997 | Miura | 423/239.2 |
| 5,705,053 A | 1/1998 | Buchanan | 208/113 |
| 5,716,514 A | 2/1998 | Buchanan | 208/113 |
| 5,741,468 A | 4/1998 | Saito | 423/239.1 |
| 5,744,113 A | 4/1998 | Hums | 423/239.1 |
| 5,744,686 A | 4/1998 | Gajda | 585/823 |
| 5,750,020 A | 5/1998 | Bhattacharyya et al. | 208/113 |
| 5,785,947 A | 7/1998 | Zones et al. | 423/705 |
| 5,807,528 A | 9/1998 | Nakano et al. | 423/213.2 |
| 5,827,793 A | 10/1998 | Hu | 502/41 |
| 5,830,346 A | 11/1998 | Harandi et al. | 208/113 |
| 5,879,645 A | 3/1999 | Park | 423/213.2 |
| 5,908,804 A | 6/1999 | Menon et al. | 502/38 |
| 5,908,806 A | 6/1999 | Kharas | 502/64 |
| 5,917,069 A | 6/1999 | Buckl | 554/193 |
| 5,955,046 A | 9/1999 | Okimura et al. | 423/239.1 |
| 5,958,818 A | 9/1999 | Demmel et al. | 502/68 |
| 5,985,225 A | 11/1999 | Ohtsuka | 423/239.2 |
| 5,993,642 A | 11/1999 | Mohr et al. | 208/46 |
| 6,017,508 A | 1/2000 | Millar et al. | 423/700 |
| 6,027,696 A | 2/2000 | Das et al. | 422/144 |
| 6,033,641 A | 3/2000 | Hall et al. | 423/239.2 |
| 6,040,259 A | 3/2000 | Mohr | 502/67 |
| 6,090,271 A | 7/2000 | Carpency | 208/113 |
| 6,103,208 A | 8/2000 | Ogawa et al. | 423/213.2 |
| 6,103,949 A | 8/2000 | Demmel et al. | 585/722 |
| 6,106,697 A | 8/2000 | Swan et al. | 208/77 |
| 6,110,258 A | 8/2000 | Fraenkel et al. | 95/117 |
| 6,114,265 A | 9/2000 | Steffens et al. | 502/52 |
| 6,129,834 A | 10/2000 | Peters et al. | 208/120.01 |
| 6,143,167 A | 11/2000 | Peters et al. | 208/113 |
| 6,143,261 A | 11/2000 | Lissy et al. | 423/213.5 |
| 6,143,681 A | 11/2000 | Sachtler et al. | 502/74 |
| 6,165,933 A | 12/2000 | Peters et al. | 502/330 |
| 6,190,538 B1 | 2/2001 | Gosselink et al. | 208/111.01 |
| 6,214,211 B1 | 4/2001 | Itoh | 208/118 |
| 6,280,607 B1 | 8/2001 | Peters et al. | 208/120.01 |
| 6,284,703 B1 | 9/2001 | Ostgard et al. | 502/301 |
| 6,309,758 B1 | 10/2001 | Schmidt | 428/570 |
| 6,358,881 B1 | 3/2002 | Peters et al. | 502/304 |
| 6,376,708 B1 | 4/2002 | Morgenstern et al. | 562/538 |
| 6,379,536 B1 | 4/2002 | Peters et al. | 208/120.01 |
| 6,380,119 B1 | 4/2002 | Grosch et al. | 502/49 |
| 6,395,403 B2 | 5/2002 | Schmidt | 428/570 |
| 6,413,898 B1 | 7/2002 | Faber et al. | 502/64 |
| 6,471,924 B1 | 10/2002 | Feeley | 423/213.5 |
| 6,479,421 B1 | 11/2002 | Vierheilig | 502/84 |
| 6,514,470 B1 | 2/2003 | Ott et al. | 423/239.1 |
| 6,528,031 B1 | 3/2003 | Park et al. | 423/239.2 |
| 6,538,169 B1 | 3/2003 | Pittman | 585/653 |
| 6,558,533 B2 | 5/2003 | Schmidt et al. | 208/244 |
| 6,660,683 B1 | 12/2003 | Yaluris et al. | 502/241 |
| 6,677,263 B2 | 1/2004 | Wang et al. | 502/73 |
| 6,884,744 B2 | 4/2005 | Cheng et al. | 502/73 |
| 7,304,011 B2 | 12/2007 | Yaluris et al. | 502/65 |
| 2001/0002426 A1 | 5/2001 | Mohr et al. | 585/407 |
| 2001/0016184 A1 | 8/2001 | Campbell et al. | 423/244.06 |
| 2002/0013228 A1 | 1/2002 | Matsumoto et al. | 502/325 |
| 2002/0016259 A1 | 2/2002 | Yoshikawa | 502/324 |
| 2002/0022573 A1 | 2/2002 | Tanada et al. | 502/344 |
| 2002/0022574 A1 | 2/2002 | Tanada et al. | 502/527.12 |
| 2002/0037808 A1 | 3/2002 | Ostgard et al. | 502/301 |
| 2002/0038051 A1 | 3/2002 | Ostgard et al. | 562/538 |
| 2002/0039550 A1 | 4/2002 | Sindlinger et al. | 423/239.2 |
| 2002/0049132 A1 | 4/2002 | Jan et al. | 502/60 |
| 2002/0061813 A1 | 5/2002 | Wang et al. | 502/73 |
| 2002/0082159 A1 | 6/2002 | Grosch et al. | 502/38 |
| 2002/0082460 A1 | 6/2002 | Verduijn et al. | 585/475 |
| 2002/0094314 A1 | 7/2002 | Miyadera et al. | 423/239.1 |

| Publication No. | Date | Inventor | Class |
|---|---|---|---|
| 2002/0094932 A1 | 7/2002 | Faber et al. | 502/74 |
| 2002/0120169 A1 | 8/2002 | Spagnol et al. | 568/316 |
| 2002/0139112 A1 | 10/2002 | Onodera et al. | 60/286 |
| 2002/0160905 A1 | 10/2002 | Loyalka et al. | 502/60 |
| 2002/0183191 A1 | 12/2002 | Faber et al. | 502/63 |
| 2002/0187098 A1 | 12/2002 | Pinnavaia et al. | 423/702 |
| 2002/0189973 A1 | 12/2002 | Henry et al. | 208/74 |
| 2002/0192155 A1 | 12/2002 | Sterte et al. | 423/700 |
| 2003/0019794 A1 | 1/2003 | Schmidt et al. | 208/244 |
| 2003/0040425 A1 | 2/2003 | Huang et al. | 502/64 |
| 2003/0044330 A1 | 3/2003 | Andorf et al. | 422/177 |
| 2003/0073566 A1 | 4/2003 | Marshall et al. | 502/64 |
| 2003/0098259 A1 | 5/2003 | Kelkar et al. | 208/120.01 |
| 2003/0115859 A1 | 6/2003 | Deeba | 60/297 |
| 2003/0165415 A1 | 9/2003 | Ott et al. | 423/239.2 |
| 2003/0166453 A1 | 9/2003 | Kuvettu et al. | 502/68 |
| 2003/0181324 A1 | 9/2003 | Hotta | 502/262 |
| 2004/0031727 A1 | 2/2004 | O'Conner et al. | 208/111.35 |
| 2004/0072675 A1 | 4/2004 | Kelkar et al. | 502/63 |
| 2004/0086442 A1 | 5/2004 | Vierheilig | 423/239.1 |
| 2004/0262197 A1 | 12/2004 | McGregor et al. | 208/120.01 |
| 2005/0100494 A1 | 5/2005 | Yaluris et al. | 423/235 |
| 2005/0232839 A1 | 10/2005 | Yaluris et al. | 423/239 |

FOREIGN PATENT DOCUMENTS

| | | |
|---|---|---|
| WO | 03/045547 | 6/2003 |
| WO | 03046112 | 6/2003 |
| WO | 2004014793 | 2/2004 |
| WO | 2005/005578 | 1/2005 |
| WO | 2005/047429 | 5/2005 |
| WO | 2005/099898 | 10/2005 |

COMPOSITIONS AND PROCESSES FOR REDUCING NOX EMISSIONS DURING FLUID CATALYTIC CRACKING

CROSS REFERENCES TO RELATED APPLICATIONS

This application is a continuation in part of U.S. patent application Ser. No. 10/909,706, filed Aug. 2, 2004 and U.S. patent application Ser. No. 10/909,709, filed Aug. 2, 2004, now abandoned.

This application is a 35 USC 371 filing of PCT International Application No. PCT/US2006/010843, filed on Mar. 24, 2006, which claims the priority of U.S. Provisional Application No, 60/635,150 filed on Apr. 27, 2005.

This application also claims the benefit of Provisional Application No. 60/675,150 filed on Apr. 27, 2005, under Title 35, United States Code, §119(e).

FIELD OF THE INVENTION

The present invention relates to $NO_x$ reduction compositions and the method of use thereof to reduce $NO_x$ emissions in refinery processes, and specifically in fluid catalytic cracking (FCC) processes. More particularly, the present invention relates to $NO_x$ reduction compositions and the method of use thereof to reduce the content of $NO_x$ off gases released from a fluid catalytic cracking unit (FCCU) regenerator during the FCC process without a substantial change in hydrocarbon conversion or the yield of valuable cracked products.

BACKGROUND OF THE INVENTION

In recent years there has been an increased concern in the United States and elsewhere about air pollution from industrial emissions of noxious oxides of nitrogen, sulfur and carbon. In response to such concerns, government agencies have placed limits on allowable emissions of one or more of these pollutants, and the trend is clearly in the direction of increasingly stringent regulations.

$NO_x$, or oxides of nitrogen, in flue gas streams exiting from fluid catalytic cracking (FCC) regenerators is a pervasive problem. Fluid catalytic cracking units (FCCUs) process heavy hydrocarbon feeds containing nitrogen compounds, a portion of which is contained in the coke on the catalyst as it enters the regenerator. Some of this coke-nitrogen is eventually converted into $NO_x$ emissions, either in the FCC regenerator or in a downstream CO boiler. Thus, all FCCUs processing nitrogen-containing feeds can have a $NO_x$ emissions problem due to catalyst regeneration.

In the FCC process, catalyst particles (inventory) are continuously circulated between a catalytic cracking zone and a catalyst regeneration zone. During regeneration, coke deposited on the cracking catalyst particles in the cracking zone is removed at elevated temperatures by oxidation with oxygen containing gases such as air. The removal of coke deposits restores the activity of the catalyst particles to the point where they can be reused in the cracking reaction. In general, when coke is burned with a deficiency of oxygen, the regenerator flue gas has a high $CO/CO_2$ ratio and a low level of $NO_x$, but when burned with excess oxygen, the flue gas has a high level of $NO_x$ and a reduced CO content. Thus, CO and $NO_x$, or mixtures of these pollutants are emitted with the flue gas in varying quantities, depending on such factors as unit feed rate, nitrogen content of the feed, regenerator design, mode of operation of the regenerator, and composition of the catalyst inventory.

Various attempts have been made to limit the amount of $NO_x$ gases emitted from the FCCU by treating the $NO_x$ gases after their formation, e.g., post-treatment of $NO_x$ containing gas streams as described in U.S. Pat. Nos. 4,434,147, 4,778, 664, 4,735,927, 4,798,813, 4,855,115, 5,413,699, and 5,547, 648.

Another approach has been to modify the operation of the regenerator to partial burn and then treat the $NO_x$ precursors in the flue gas before they are converted to $NO_x$, e.g., U.S. Pat. Nos. 5,173,278, 5,240,690, 5,372,706, 5,413,699, 5,705,053, 5,716,514, and 5,830,346.

Yet another approach has been to modify the operation of the regenerator to reduce $NO_x$ emissions, e.g., U.S. Pat. No. 5,382,352, or modify the CO combustion promoter used, e.g., U.S. Pat. Nos. 4,199,435, 4,812,430, and 4,812,431. Enrichment of air with oxygen in a regenerator operating in partial burn mode has also been suggested, e.g., U.S. Pat. No. 5,908, 804.

Additives have also been used in attempts to deal with $NO_x$ emissions. U.S. Pat. Nos. 6,379,536, 6,280,607, 6,129,834 and 6,143,167 disclose the use of $NO_x$ removal compositions for reducing $NO_x$ emissions from the FCCU regenerator. U.S. Pat. Nos. 6,165,933 and 6,358,881 also disclose a $NO_x$ reduction composition, which promotes CO combustion during the FCC catalyst regeneration process step while simultaneously reducing the level of $NO_x$ emitted during the regeneration step. $NO_x$ reduction compositions disclosed by these patents may be used as an additive which is circulated along with the FCC catalyst inventory or incorporated as an integral part of the FCC catalyst.

U.S. Pat. Nos. 4,973,399 and 4,980,052 disclose reducing emissions of $NO_x$ from the regenerator of the FCCU by incorporating into the circulating inventory of cracking catalyst separate additive particles containing a copper-loaded zeolite.

Many additive compositions heretofore used to control $NO_x$ emissions have typically caused a significant decrease in hydrocarbon conversion or the yield of valuable cracked products, e.g., gasoline, light olefins and liquefied petroleum gases (LPGs), while increasing the production of coke. It is a highly desirable characteristic for $NO_x$ additives added to the FCCU not to affect the cracked product yields or change the overall unit conversion. The operation of the FCCU is typically optimized based on the unit design, feed and catalyst to produce a slate of cracked products and maximize refinery profitability. This product slate is based on the value model of the specific refinery. For example, during the peak summer driving season many refiners want to maximize gasoline production, while during the winter season refiners may want to maximize heating oil production. In other cases a refinery may find it profitable to produce light olefins products that can be sold in the open market or used in an associated petrochemical plant as feedstocks.

When a $NO_x$ reduction additive increases coke production, the FCCU may have insufficient air capacity to burn the extra coke and may result in a lower feed throughput in the unit. If the additive increases the production of low value dry gas, the production of more valuable products may decrease. An increase in dry gas may exceed the ability of the unit to handle it, thus forcing a reduction of the amount of feed processed. While an additive that increases light olefins production may be desirable if the refinery values these products and the unit has the equipment necessary to process the extra light hydrocarbons, the additive may reduce profitability if the refinery's goal is to maximize gasoline production. Light olefins are typically made in the FCCU at the expense of gasoline production. Even an additive which increases unit conversion may be undesirable if it affects product yields, causes the unit to reach an equipment limitation, and/or decreases the amount of feed that can be processed.

Consequently, any change to the FCCU that affects the product slate or changes the ability to process feed at the desired rate can be detrimental to the refinery profitability. Therefore, there exists a need for $NO_x$ control compositions which do not significantly affect product yields and overall unit conversion.

SUMMARY OF THE INVENTION

It has now been discovered that certain metal-stabilized zeolites exhibit increased activity and stability to reduce $NO_x$ emissions during a catalytic cracking process. Incorporation of the metal-stabilized zeolite components with an inventory of a catalytic cracking catalyst, in particular a cracking catalyst inventory containing an active Y-type zeolite, being circulated throughout a fluid catalytic cracking unit (FCCU) during a fluid catalytic cracking (FCC) process provides superior $NO_x$ control performance without substantially changing or affecting the hydrocarbon conversion or the yield of cracked petroleum products produced during the FCC process.

In accordance with the present invention, the $NO_x$ reduction compositions of the invention typically comprise a particulate composition containing particles of a zeolite component which has the ability to reduce $NO_x$ during an FCC process and which has been stabilized with a metal selected from the group consisting of zinc, iron and mixtures thereof. In a preferred embodiment of the invention, the particulate zeolite component is ferrierite. In a even more preferred embodiment of the invention, the zeolite particles are bound with an inorganic binder. The binder preferably comprises silica, alumina or silica-alumina. The zeolite may be exchanged with hydrogen, ammonium, alkali metal and combinations thereof. The preferred alkali metal is sodium, potassium or combinations thereof.

In one aspect of the invention, $NO_x$ reduction additive compositions based on a metal-stabilized zeolite are provided. The compositions are added to a circulating inventory of the catalytic cracking catalyst as a separate admixture of particles to reduce $NO_x$ emissions released from the FCCU regenerator during the FCC process.

In another aspect of the invention, $NO_x$ reduction catalyst compositions which comprise a metal-stabilized zeolite incorporated as an integral component of an FCC catalyst, preferably, containing a Y-type zeolite active cracking component, are provided.

In yet another aspect of the invention, improved $NO_x$ reduction compositions are provided which compositions reduce $NO_x$ emissions from the FCCU regenerator during the FCC process while substantially maintaining hydrocarbon conversion and the yield of cracked petroleum products and minimizing an increase in the production of coke.

It is another aspect of the present invention to provide a process for the reduction of the content of $NO_x$ in the off gas of the FCCU regenerator during the FCC process using $NO_x$ reduction compositions in accordance with the present invention.

Another aspect of the invention is to provide improved FCC processes for the reduction of the content of $NO_x$ in the off gases of the FCCU regenerator without substantially affecting hydrocarbon conversion or the yield of petroleum products produced during the FCC process.

These and other aspects of the present invention are described in further detail below.

DETAILED DESCRIPTION OF THE INVENTION

Although several nitrogen oxides are known which are relatively stable at ambient conditions, for purposes of the present invention, $NO_x$ will be used herein to represent nitric oxide, nitrogen dioxide (the principal noxious oxides of nitrogen) as well as $N_2O_4$, $N_2O_5$ and mixtures thereof.

The present invention encompasses the discovery that the use of certain zeolite containing $NO_x$ reduction compositions in combination with a fluid catalytic cracking (FCC) catalyst, preferably a catalyst comprising an active Y-type zeolite, is very effective for the reduction of $NO_x$ emissions released from the FCCU regenerator under FCC process conditions without a substantial change in hydrocarbon feed conversion or the yield of cracked products. Compositions of the invention generally comprise at least one metal stabilized zeolite component having the ability to reduce $NO_x$ emissions from the regenerator of a FCCU under FCC conditions. The zeolite is stabilized with a metal or (metal ion) selected from the group consisting of zinc, iron and mixtures thereof, to provide a $NO_x$ reducing zeolite. In a preferred embodiment of the invention, the zeolite is bound with an inorganic binder to form a particulate $NO_x$ reduction composition. The particulate $NO_x$ reduction composition may be added to the circulating inventory of the catalytic cracking catalyst as a separate particle additive. In another embodiment of the invention, the zeolite is incorporated as an integral component of the cracking catalyst, wherein the zeolite is stabilized with the desired metal prior to or after incorporation in the cracking catalyst composition.

For purposes of the present invention, the phrase "a substantial change in hydrocarbon feed conversion or the yield of cracked products" is defined herein to mean in the alternative (i) less than a 30% relative change, preferably less than a 20% relative change and most preferably less than a 10% relative change in the yield of LCO (light cycle oils), bottoms and gasoline in combination with LPG as compared to the baseline yield of the same or substantially the same products; or (ii) less than a 10% relative change, preferably less than a 6.5% relative change and most preferably less than a 5% relative change in the hydrocarbon feed conversion as compared to the baseline conversion. The conversion is defined as 100% times (1−bottoms yield−LCO yield). When the $NO_x$ reduction composition is used as a separate additive, the baseline is the mean conversion or yield of a product in the FCCU, operating with the same or substantially the same feed and under the same or substantially the same reaction and unit conditions, but before the additive of the present invention is added to the catalyst inventory. When the $NO_x$ reduction composition is integrated or incorporated into the cracking catalyst particles to provide an integral $NO_x$ reduction catalyst system, a significant change in the hydrocarbon conversion or yield of cracked products is determined using a baseline defined as the mean conversion or yield of a product in the same or substantially the same FCCU operating with the same or substantially the same feed, under the same or substantially the same reaction and unit conditions, and with a cracking catalyst inventory comprising the same or substantially the same cracking catalyst composition as that containing the $NO_x$ reduction composition, except that the $NO_x$ reduction composition is replaced in the cracking catalyst with a matrix component such as kaolin or other filler. The percent changes specified above are derived from statistical analysis of operating data obtained from the Davison Circulating Riser (DCR) as described in the following publications: 1) G. W. Young, G. D. Weatherbee, and S. W. Davey, "Simulating Commercial FCCU yields with the Davison Circulating Riser (DCR) pilot plant unit," National Petroleum Refiners Association (NPRA) Paper AM88-52; and 2) G. W. Young, "Realistic Assessment of FCC Catalyst Performance in the Laboratory," in Fluid Catalytic Cracking: Science and Technology, J. S. Magee and M. M. Mitchell, Jr. Eds., Studies in Surface Science and Catalysis, Volume 76, p. 257, Elsevier Science Publishers B.V., Amsterdam 1993, ISBN 0-444-89037-8.

Zeolites useful in the present invention include zeolites having that ability to reduce $NO_x$ emissions during a catalytic cracking process under catalytic cracking conditions, in particularly, during a FCC process under FCC conditions. In general, the $NO_x$ reducing zeolites include zeolites having a pore size ranging from about 2 to about 7.2 Angstroms with $SiO_2$ to $Al_2O_3$ molar ratio of less than about 500, preferably less than 250, most preferably less than 100. Preferably, the zeolite is selected from the group consisting of ferrierite, ZSM-11, beta, MCM-49, mordenite, MCM-56, Zeolite-L, zeolite Rho, errionite, chabazite, clinoptilolite, MCM-22, MCM-35, MCM-61, Offretite, A, ZSM-12, ZSM-23, ZSM-18, ZSM-22, ZSM-57, ZSM-61, ZK-5, NaJ, Nu-87, Cit-1, SSZ-35, SSZ-48, SSZ-44, SSZ-23, Dachiardite, Merlinoite, Lovdarite, Levyne, Laumontite, Epistilbite, Gmelonite, Gismondine, Cancrinite, Brewsterite, Stilbite, Paulingite, Goosecreekite, Natrolite, omega or mixtures thereof. In a more preferred embodiment of the invention, the $NO_x$ reducing zeolite component is a zeolite selected from the group consisting of ferrierite, beta, MCM-49, mordenite, MCM-56, Zeolite-L, zeolite Rho, errionite, chabazite, clinoptilolite, MCM-22, Offretite, A, ZSM-12, ZSM-23, omega and mixtures thereof. In the most preferred embodiment of the invention, the zeolite is ferrierite.

In a preferred embodiment of the invention, the zeolite comprising the $NO_x$ reduction composition of the invention has a surface area of at least 100 m$^2$/g, preferably at least 200 m$^2$/g and most preferably at least 300 m$^2$/g. In another embodiment of the invention, the zeolite is exchanged with a material selected from the group consisting of hydrogen, ammonium, alkali metal and combinations thereof, prior to incorporation into the binder to form a particulate $NO_x$ reduction composition, or FCC catalyst or stabilization with the metal or metal ion. The preferred alkali metal is one selected from the group consisting of sodium, potassium and mixtures thereof.

The $NO_x$ reduction composition comprises at least one $NO_x$ reducing zeolite stabilized with a stabilizing amount, e.g., from about 1.0 to about 25 weight percent, preferably from about 5 to about 15 weight percent, most preferably from about 8 to about 12 weight percent, measured as the metal oxide, based on total weight of the $NO_x$ reduction composition, of a metal or metal ion selected from the group consisting of zinc, iron and mixtures thereof.

Typically, the stabilization of the zeolite is accomplished in any manner sufficient to deposit the desired stabilizing metal or metal ion in or on the zeolite component. It is preferred that the stabilizing metal or metal ion is deposited in such a manner such that the metal or metal ions reside in the pores of the zeolite or are incorporated within the framework of the zeolite. As will be understood by one skilled in the art, this may be accomplished by various methods.

The metal or metal ions may be incorporated within the framework of the zeolite by synthesizing the zeolite in the presence of the metal or metal ion. For example, the metal component may also be added to the synthesis gel during preparation of the zeolite. In the alternative, the metal or metal ion component may be added along with other reactants as a component used to synthesize the zeolite or partially substituted or exchanged for one of the other reactants, such as aluminum ion, used to synthesize the zeolite. The stabilizing metal or metal ion may also be incorporated into the pores of the zeolite using conventional methods such as, e.g. ion exchange, impregnation or the like, to form the $NO_x$ reduction composition of the invention.

A typical solid-state exchange may be accomplished by blending a finely ground metal salt with the zeolite and heating the two components together at a time and temperature sufficient to allow the exchange to occur. The blend may then be water-washed to remove any unexchanged metal ion and/or any remaining salt to provide the metal exchanged zeolite.

The stabilizing metal or metal ion component may also be impregnated or exchanged, typically by solution exchange, on a particulate $NO_x$ reduction composition formed by binding the $NO_x$ reducing zeolite with an inorganic binder to form particles. While the present invention is not limited to any particular process of preparation of the particulate composition, typically the particulate $NO_x$ reduction compositions of the invention are prepared by forming an aqueous slurry containing the $NO_x$ reducing zeolite, inorganic binder, and optional matrix materials, in an amount sufficient to provide at least 10.0 weight percent of $NO_x$ reducing zeolite component and at least 5.0 weight percent of binder material in the final composition and, thereafter, spray drying the aqueous slurry to form particles. The spray-dried particles are optionally dried at a sufficient temperature for a sufficient time to remove volatiles, e.g., at about 90° C. to about 320° C. for about 0.5 to about 24 hours. In a preferred embodiment of the invention, the zeolite containing aqueous slurry is milled prior to spray-drying to reduce the mean particle size of materials contained in the slurry to 10 μm or less, preferably 5 μm or less, most preferably 3 μm or less. The aqueous slurry may be milled prior to or after incorporation of the binder and/or matrix materials as desired.

The spray-dried composition may be calcined at a temperature and for a time sufficient to remove volatiles and provide sufficient hardness to the binder for use in the FCCU under FCC process conditions, preferably from about 320° C. to about 900° C. from about 0.5 to about 6 hours.

Optionally, the dried or calcined composition is washed or exchanged with an aqueous solution of ammonia or ammonium salt (e.g., ammonium sulfate, nitrate, chloride, carbonate, phosphate and the like), or an inorganic or organic acid (e.g., sulfuric, nitric, phosphoric, hydrochloric, acetic, formic and the like) to reduce the amount of alkaline metals, e.g. sodium or potassium, in the finished product.

Impregnation of the particulate $NO_x$ reduction composition may typically be accomplished by dissolving a soluble metal salt in water and thereafter impregnating the particulate composition with the solution.

It is also within the scope of the present invention that the stabilizing metal or metal ion component may added to the feed slurry during preparation of the particulate $NO_x$ reduction composition. That is, the $NO_x$ reducing zeolite, binder and any matrix components may be combined with the stabilizing metal component to form the feed slurry followed by formation of a particulate composition, typically by spray drying as described hereinabove. It is further within the scope of the present invention that the stabilizing metal or metal ion component may be impregnated or exchanged, typically by solution exchange, on the $NO_x$ reducing zeolite prior to binding the $NO_x$ reducing zeolite particle with an inorganic binder to form the particulate $NO_x$ reduction composition as described herein above.

Where the $NO_x$ reduction composition is used as an integral component of the cracking catalyst, the stabilizing metal or metal ion may be exchanged or impregnated onto the $NO_x$ reducing zeolite before or after incorporation of the zeolite as a component of the catalyst. Without intending to limit the incorporation of the $NO_x$ reducing zeolite component within the cracking catalyst to any specific method of cracking catalyst manufacturing, typically, the zeolite component, any additional zeolites, the cracking catalyst zeolite, usually USY or REUSY-type, and any matrix materials are slurried in water. The slurry is milled to reduce the mean particle size of solids in the slurry to less than 10 μm, preferably to less than 5 μm, most preferably less than 3 μm. The milled slurry is combined with a suitable binder, i.e., a silica sol binder, and optional matrix material, e.g. clay. The slurry is then mixed and spray-dried to form a catalyst. The spray-dried catalyst is optionally washed using an aqueous solution of ammonium hydroxide, an ammonium salt, an inorganic or organic acid, and water to remove the undesirable salts. The washed catalyst may be exchanged with a water soluble rare-earth salt, e.g., rare-earth chlorides, nitrates and the like.

Alternatively, the $NO_x$ reducing zeolite component, optional additional zeolites, the cracking catalyst zeolite, any matrix materials, a rare-earth water soluble salt, clay and alumina sol binder are slurried in water and blended. The slurry is milled and spray-dried. The spray-dried catalyst is calcined at about 250° C. to about 90° C. The spray-dried catalyst may then optionally be washed using an aqueous solution of ammonium hydroxide, an ammonium salt, an inorganic or organic acid, and water to remove the undesirable salts. Optionally, the catalyst may be exchanged with a water-soluble rare-earth salt after it has been washed, by any of the methods known in the art. It is within the scope of the invention that the stabilizing metal component may be added to the catalyst feed slurry at any step before formation of the final catalyst composition.

Typically, the stabilizing metal or metal ion will be exchanged or impregnated on the $NO_x$ reducing zeolite or a final catalyst composition containing the $NO_x$ reducing zeolite using solution exchange, solid-state exchange or any other conventional methods. In a typical solution phase exchange, the zeolite is slurried up in an aqueous solution containing the desired metal component. The pH and temperature of the solution are controlled to maximize the exchange of the metal component on the zeolite. The material may then be filtered and water-washed to remove any unexchanged metal ion and/or any remaining salt. If the metal is added by impregnation, a soluble metal salt would be dissolved in water and the zeolite impregnated with the solution. Additionally, the exchange or impregnation may be carried out on a $NO_x$ reducing zeolite that contains alkali metal or alkaline earth metal ions or on a zeolite that has been converted to its hydrogen form.

The amount of $NO_x$ reducing zeolite used in the $NO_x$ reduction compositions of the invention will vary depending upon several factors, including but not limited to, the mode of combining the $NO_x$ reducing zeolite with the catalytic cracking catalyst and the type of cracking catalyst used. Where the compositions of the invention are separate additive compositions and comprise a particulate composition formed by binding particles of the $NO_x$ reducing zeolite with a suitable inorganic binder, generally the amount of the $NO_x$ reducing zeolite component present in the particulate compositions is at least 10, preferably at least 30, most preferably at least 40 and even more preferably at least 50, weight percent based on the total weight of the composition. Typically, the particulate additive composition contains from about 10 to about 85, preferably from about 30 to about 80, most preferably, from about 40 to about 75, weight percent of the $NO_x$ reducing zeolite component based on the total weight of the additive composition.

Binder materials useful to prepare the particulate $NO_x$ reduction compositions of the invention include any inorganic binder which is capable of binding a zeolite powder to form particles having properties suitable for use in the FCCU under FCC process conditions. Typical inorganic binder materials useful to prepare compositions in accordance with the present invention include, but are not limited to, alumina, silica, silica-alumina, aluminum phosphate and the like, and mixtures thereof. Preferably, the binder is selected from the group consisting of alumina, silica, silica-alumina and mixtures thereof. More preferably, the binder comprises alumina. Even more preferably, the binder comprises an acid or base peptized alumina. Most preferably, the binder comprises an alumina sol, e.g., aluminum chlorohydrol. Generally, the amount of binder material present in the particular additive compositions comprises from about 5 to about 50 weight percent, preferably from about 10 to about 30 weight percent, most preferably from about 15 to about 25 weight percent, of the additive composition of the invention.

Additional materials optionally present in the particulate compositions of the present invention include, but are not limited to, fillers (e.g., kaolin clay) or matrix materials (e.g., alumina, silica, silica-alumina, yttria, lanthana, ceria, neodymia, samaria, europia, gadolinia, titania, zirconia, praseodymia and mixtures thereof). When used, the additional materials are used in an amount which does not significantly adversely affect the performance of the compositions to reduce $NO_x$ emissions released from the FCCU regenerator under FCC conditions, the hydrocarbon feed conversion or the product yield of the cracking catalyst. In general the additional materials will comprise no more than about 70 weight percent of the compositions. It is preferred, however, that the compositions of the invention consist essentially of the $NO_x$ reducing zeolite and an inorganic binder.

Particulate additive compositions of the invention should have a particle size sufficient to permit the composition to be circulated throughout the FCCU simultaneously with the inventory of cracking catalyst during the FCC process. Typically the composition of the invention will have a mean particle size of greater than 45 μm. Preferably, the mean particle size is from about 50 to about 200 μm, most preferably from about 55 to about 150 μm, even more preferred from about 60 to about 120 μm. The compositions of the invention typically have a Davison attrition index (DI) value of less than about 50, preferably less than about 20, most preferably less than about 15.

Particulate compositions of the invention may be circulated in the form of separate particle additives along with the main cracking catalyst throughout the FCCU. Generally, the particulate additive composition is used in an amount of at least 0.1 weight percent of the FCC catalyst inventory. Preferably the amount of the additive composition used ranges from about 0.1 to about 80 weight percent, most preferably from about 1 to about 75 weight percent of the FCC catalyst inventory. Advantageously, when used in combination with specially formulated high activity cracking catalyst, e.g. the high activity cracking catalyst such as described and disclosed in U.S. patent application Ser. No. 09/833,603, filed Apr. 13, 2001, said document herein incorporated by reference, the use of additive levels as high as 80 weight percent of the FCC catalyst inventory allows for the effective reduction of $NO_x$ emissions from the FCCU regenerator without a loss of cracking activity due to dilution of the cracking catalyst inventory.

As will be understood by one skilled in the art, separate particulate compositions of the invention may be added to the FCCU in the conventional manner, e.g., with make-up catalyst to the regenerator or by any other convenient method.

When integrated into the FCC catalyst particles, the $NO_x$ reduction component typically represents at least 0.1 weight percent of the FCC catalyst particle. Preferably, the amount of the $NO_x$ reduction component used ranges from about 0.1 to about 70 weight percent, most preferably from about 1 to about 50 weight percent, of the FCC catalyst particles.

As stated herein above, the integrated FCC catalyst will typically comprise the $NO_x$ reducing zeolite component along with the cracking catalyst zeolite, inorganic binder materials and optionally, matrix, fillers, and other additive components such as metals traps (for example, traps for Ni and V) to make up the cracking catalyst. The cracking catalyst zeolite, usually a Y, USY or REUSY-type, provides the majority of the cracking activity and is typically present in a range from about 10 to about 75, preferably from about 15 to about 60 and most preferably from about 20 to about 50 weight percent based on the total weight of the composition. Inorganic binder materials useful to prepare integrated catalyst compositions in accordance with the present invention include any inorganic material capable of binding the components of the integrated catalyst to form particles having properties suitable for use in the FCCU under FCC process conditions. Typically, the inorganic binder materials include, but are not limited to, alumina, silica, silica-alumina, aluminum phosphate and the like, and mixtures thereof. Preferably, the binder is selected from the group consisting of alumina, silica, silica-alumina. Generally, the amount of binder material present in the integrated catalyst composition is less than 50 weight percent based on the total weight of the catalyst composition. Preferably, the inorganic binder materials is present in the integrated catalyst in an amount ranging from about 5 to about 45 weight percent, more preferably from about 10 to about 30 weight percent and most preferably from about 15 to about 25 weight percent, based on the total weight of the composition.

The matrix materials optionally present in the integrated catalyst compositions of the present invention include, but are not limited to alumina, silica-alumina, rare earth oxides such as lanthana, transition metal oxides such as titania, zirconia, and manganese oxide, group 2A oxides such as magnesium and barium oxides, clays such as kaolin, and mixtures thereof. The matrix and/or fillers are typically present in the integral catalyst in an amount of less than 50 weight percent based on the total weight of the catalyst composition. Preferably, the matrix and/or fillers are present in an amount ranging from about 1 to about 45 weight percent based on the total weight of the catalyst composition.

The particle size and attrition properties of the integral catalyst affect fluidization properties in the unit and determine how well the catalyst is retained in the commercial FCC unit. The integral catalyst composition of the invention typically has a mean particle size of about 45 to about 200 µm, more preferably from about 50 µm to about 150 µm. The attrition properties of the integral catalyst, as measured by the Davison Attrition Index (DI), have a DI value of less than 50, more preferably less than 20 and most preferably less than 15.

In a preferred embodiment of the invention, the FCC cracking catalyst contains a Y-type zeolite. The $NO_x$ reducing zeolite may be added as a separate additive particle to a circulating inventory of the cracking catalyst or incorporated directly into the Y-type zeolite containing cracking catalyst as an integral component of the catalyst. In either case, the Y-type zeolite is present in an amount sufficient to provide adequate cracking activity in the FCCU, as will be readily determined by one skilled in the art. Preferably, the Y-type zeolite is present in an amount sufficient to provide a ratio of $NO_x$ reducing zeolite to Y-type zeolite of less than 2, preferably less than 1, in the total catalyst inventory.

Somewhat briefly, the FCC process involves the cracking of heavy hydrocarbon feedstocks to lighter products by contact of the feedstock in a cyclic catalyst recirculation cracking process with a circulating fluidizable cracking catalyst inventory consisting of particles having a mean size ranging from about 50 to about 150 µm, preferably from about 60 to about 120 µm. The catalytic cracking of these relatively high molecular weight hydrocarbon feedstocks results in the production of a hydrocarbon product of lower molecular weight. The significant steps in the cyclic FCC process are:

(i) the feed is catalytically cracked in a catalytic cracking zone, normally a riser cracking zone, operating at catalytic cracking conditions by contacting feed with a source of hot, regenerated cracking catalyst to produce an effluent comprising cracked products and spent catalyst containing coke and strippable hydrocarbons;

(ii) the effluent is discharged and separated, normally in one or more cyclones, into a vapor phase rich in cracked product and a solids rich phase comprising the spent catalyst;

(iii) the vapor phase is removed as product and fractionated in the FCC main column and its associated side columns to form gas and liquid cracking products including gasoline;

(iv) the spent catalyst is stripped, usually with steam, to remove occluded hydrocarbons from the catalyst, after which the stripped catalyst is oxidatively regenerated in a catalyst regeneration zone to produce hot, regenerated catalyst which is then recycled to the cracking zone for cracking further quantities of feed.

Conventional FCC catalysts include, for example, zeolite based catalysts with a faujasite cracking component as described in the seminal review by Venuto and Habib, *Fluid Catalytic Cracking with Zeolite Catalysts*, Marcel Dekker, New York 1979, ISBN 0-8247-6870-1, as well as in numerous other sources such as Sadeghbeigi, *Fluid Catalytic Cracking Handbook*, Gulf Publ. Co. Houston, 1995, ISBN 0-88415-290-1. Preferably, the FCC catalyst is a catalyst comprising a Y-type zeolite active cracking component. In a particularly preferred embodiment of the invention, the FCC catalysts consist of a binder, usually silica, alumina, or silica-alumina, a Y-type zeolite active component, one or more matrix aluminas and/or silica-aluminas, and fillers such as kaolin clay. The Y-type zeolite may be present in one or more forms and may have been ultra stabilized and/or treated with stabilizing cations such as any of the rare-earths.

Typical FCC processes are conducted at reaction temperatures of 480° C. to 600° C. with catalyst regeneration temperatures of 600° C. to 800° C. As it is well known in the art, the catalyst regeneration zone may consist of a single or multiple reactor vessels. The compositions of the invention may be used in FCC processing of any typical hydrocarbon feedstock. Suitable feedstocks include petroleum distillates or residuals of crude oils having a boiling point range of about 150° C. to about 900° C., preferably, about 200° C. to about 800° C., which when catalytically cracked provide a gasoline or other petroleum product. Synthetic feeds having boiling points of about 200° C. to about 800° C., such as oil from coal, tar sands or shale oil, can also be included.

In order to remove coke from the catalyst, oxygen or air is added to the regeneration zone. This is performed by a suitable sparging device in the bottom of the regeneration zone, or if desired, additional oxygen is added to the dilute or dense phase of the regeneration zone.

Additive compositions in accordance with the invention dramatically reduce, i.e., by at least 10%, preferably, at least 20%, the emissions of $NO_x$ in the FCCU regenerator effluent during the catalyst regeneration, while substantially maintaining the hydrocarbon feed conversion or the yield of cracked products, e.g., gasoline and light olefins, obtained from the cracking catalyst. In some cases, $NO_x$ reduction of 70% or greater is readily achievable using the compositions and method of the invention without significantly affecting the cracked products yields or feed conversion. However, as will be understood by one skilled in the FCC art, the extent of $NO_x$ reduction will depend on such factors as, for example, the composition and amount of the additive utilized; the design and the manner in which the catalytic cracking unit is operated, including but not limited to oxygen level and distribution of air in the regenerator, catalyst bed depth in the regenerator, stripper operation and regenerator temperature, the properties of the hydrocarbon feedstock cracked, and the presence of other catalytic additives that may affect the chemistry and operation of the regenerator. Thus, since each FCCU is different in some or all of these respects, the effectiveness of the process of the invention may be expected to vary from unit to unit. $NO_x$ reduction compositions of the invention also prevent a significant increase in the production of coke during the FCC process.

It is also within the scope of the invention that $NO_x$ reduction compositions of the invention may be used alone or in combination with one or more additional $NO_x$ reduction component to achieve $NO_x$ reduction more efficiently than the use of either of the compositions alone. Preferably, the additional $NO_x$ reduction component is a non-zeolitic material, that is, a material that contains no or substantially no (i.e., less than 5 weight percent, preferably less than 1 weight percent) zeolite.

It is also contemplated within the scope of the present invention that additive compositions in accordance with the present invention may be used in combination with other additives conventionally used in the FCC process, e.g., $SO_x$ reduction additives, gasoline-sulfur reduction additives, CO combustion promoters, additives for the production of light olefins, and the like.

The scope of the invention is not in any way intended to be limited by the examples set forth below. The examples include the preparation of additives useful in the process of the invention and the evaluation of the invention process to reduce $NO_x$ in a catalytic cracking environment. The examples are given as specific illustrations of the claimed invention. It should be understood, however, that the invention is not limited to the specific details set forth in the examples.

All parts and percentages in the examples, as well as the remainder of the specification which refers to solid compositions or concentrations, are by weight unless otherwise specified. Concentrations of gaseous mixtures are by volume unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLES

The performance evaluation of Additives A through H for the reduction of NO emissions from an FCC unit was conducted by using the DCR. In each of the experiments, the DCR was operated under "full burn" regeneration conditions, where "full burn" is defined as the condition wherein the amount of air added to the regenerator is sufficient to convert all the coke species on the spent FCC catalyst to $CO_2$ before leaving the regenerator. The testing was performed with 1% excess $O_2$ in the regenerator, and with the regenerator operating at 705° C.

Example 1

A composition comprising 75% ferrierite and 25% Alumina Sol was prepared as follows: An aqueous slurry was prepared which contained 25% $Al_2O_3$ from aluminum chlorohydrol solution (23% solids), 75% ferrierite ($SiO_2/Al_2O_3$=20, $Na_2O+K_2O$=6-10 wt %), and enough additional water to make a slurry that contained about 42-44% solids. The slurry was milled to an average particle size of less than 3.0 μm and then spray dried. The spray-dried product was calcined for 20 to 40 minutes at 400 to 450° C. The calcined catalyst was washed with an ammonium sulfate solution, followed by water, to decrease the $K_2O$ level to less than 1.0 wt %. The catalyst was designated as Additive A, the properties of which are shown in Table 1 below.

Example 2

A composition comprising 73% ferrierite, 2.5% ZnO and 24.5% Alumina Sol was prepared as follows: An aqueous slurry was prepared which contained 6520 g of aluminum chlorohydrol solution (23% solids), 4500 g (dry basis) of ferrierite ($SiO_2/Al_2O_3$=20, $Na_2O+K_2O$<0.5 wt %), 250 g of $ZnCl_2$ and enough additional water to make a slurry that contained about 44% solids. The slurry was milled in a Drais mill to an average particle size of less than 2.5 μm and then spray dried in a Bowen spray dryer. The spray-dried product was calcined for 1.5 hours at 593° C. The catalyst was designated as Additive B, the properties of which are shown in Table 1 below.

Example 3

A composition comprising 72.1% ferrierite, 3.9% ZnO and 24% Alumina Sol was prepared as follows: An aqueous slurry was prepared which contained 6520 g of aluminum chlorohydrol solution (23% solids), 4500 g (dry basis) of ferrierite ($SiO_2/Al_2O_3$=20, $Na_2O+K_{2O}$<0.5 wt %), 400 g of $ZnCl_2$ and enough additional water to male a slurry that contained about 44% solids. The slurry was milled in a Drais mill to an average particle size of less than 2.5 μm and then spray dried in a Bowen spray dryer. The spray-dried product was calcined for 1.5 hours at 593° C. This catalyst was designated as Additive C, the properties of which are shown in Table 1 below.

Example 4

A composition comprising 70.7% ferrierite, 5.8% ZnO and 23.5% Alumina Sol was prepared as follows. An aqueous slurry was prepared which contained 6520 g of aluminum chlorohydrol solution (23% solids), 4500 g (dry basis) of ferrierite ($SiO_2/Al_2O_3$=20, $Na_2O+K_2O$<0.5 wt %), 600 g of $ZnCl_2$ and enough additional water to make a slurry that contained about 44% solids. The slurry was milled in a Drais mill to an average particle size of less than 2.5 μm and then spray dried in a Bowen spray dryer. The spray-dried product was calcined for 1.5 hours at 593° C. The catalyst was designated as Additive D, the properties of which are shown in Table 1 below.

Example 5

A composition comprising 69.5% ferrierite, 7.4% ZnO and 23.1% Alumina Sol was prepared as follows: An aqueous slurry was prepared which contained 6520 g of aluminum chlorohydrol solution (23% solids), 4500 g (dry basis) of ferrierite ($SiO_2/Al_2O_3$=20, $Na_2O+K_2O$<0.5 wt %), 800 g of $ZnCl_2$ and enough additional water to make a slurry that contained about 44% solids. The slurry was milled in a Drais mill to an average particle size of less than 2.5 μm and then spray dried in a Bowen spray dryer. The spray-dried product was calcined for 1.5 hours at 593° C. The catalyst was designated as Additive E, the properties of which are shown in Table 1 below.

Example 6

A composition comprising 67% ferrierite, 10.7% ZnO and 22.3% Alumina Sol was prepared as follows: An aqueous slurry was prepared which contained 6520 g of aluminum chlorohydrol solution (23% solids), 4500 g (dry basis) of ferrierite ($SiO_2/Al_2O_3$=20, $Na_2O+K_2O$<0.5 wt %), 1200 g of $ZnCl_2$ and enough additional water to make a slurry that contained about 44% solids. The slurry was milled in a Drais mill to an average particle size of less than 2.5 μm and then spray dried in a Bowen spray dryer. The spray-dried product was calcined for 1.5 hours at 593° C. The catalyst was designated as Additive F, the properties of which are shown in Table 1 below.

Example 7

An Additive G was prepared as follows: A sample of 732.2 gms dry basis of Additive D, prepared as shown in Example 4, was impregnated with a solution prepared with 172.9 g Zn $(Acetate)_2.2H_2O$, 281 ml $H_2O$ and 209.4 ml of a 30% $NH_4OH$ solution. It was oven dried for 4 hours at 287° C., reimpregnated with a solution of the same composition, and dried for 4 hours at 287° C. The sample was then calcined for 2 hours at 593° C. Additive G had the properties as shown in Table 1 below.

TABLE 1

Properties of Additives A through G

|  |  | Additive A | Additive B | Additive C | Additive D | Additive E | Additive F | Additive G |
|---|---|---|---|---|---|---|---|---|
| $SiO_2$ | wt % | 63.07 | 68.20 | 65.64 | 64.57 | 63.55 | 61.71 |  |
| $Al_2O_3$ | wt % | 33.59 | 28.85 | 29.98 | 29.21 | 28.57 | 27.11 | 24.5 |
| $RE_2O_3$ | wt % | 0.41 | 0.03 | 0.01 | 0.01 | 0.01 | 0.01 | 0.005 |
| $Na_2O$ | wt % | 0.17 | 0.07 | 0.08 | 0.07 | 0.08 | 0.07 | 0.06 |
| $SO_4$ | wt % | 1.59 | — | — | 0.04 | 0.03 | 0.03 | — |
| ZnO | wt % | 0.05 | 2.28 | 3.85 | 5.76 | 7.35 | 10.73 | 19.42 |
| $K_2O$ | wt % | 0.77 | 0.09 | 0.09 | 0.10 | 0.10 | 0.09 |  |
| SA | $m^2/g$ | 299 | 289 | 268 | 174 | 122 | 67 | 86 |
| Zeolite | $m^2/g$ | 226 | 222 | 214 | 113 | 56 | 61 | 86 |
| Steam deactivation: 24 h/1400/20% steam | | | | | | | | |
| SA | $m^2/g$ | 276 | 276 | 271 | 265 | 254 | 245 | 154 |
| Zeolite | $m^2/g$ | 218 | 223 | 216 | 203 | 200 | 181 | 84 |

Example 8

A composition comprising 62.5% ferrierite, 10.7% ZnO, 4.5% Catapal C alumina and 22.3% Alumina Sol was prepared as follows: An aqueous slurry was prepared which contained 6520 g of aluminum chlorohydrol solution (23% solids), 4200 g (dry basis) of ferrierite ($SiO_2/Al_2O_3$=20, $Na_2O+K_2O$<0.5 wt %), 300 g (dry basis) Catapal C alumina, 1200 g of $ZnCl_2$ and enough additional water to make a slurry that contained about 44% solids. The slurry was milled in a Drais mill to an average particle size of less than 2.5 μm and then spray dried in a Bowen spray dryer. The spray-dried product was calcined for 1.5 hours at 593° C. The catalyst is designated as Additive H, the properties of which are shown in Table 2 below.

Example 9

A composition comprising 65% ferrierite, 15% Clay and 20% Alumina Sol was prepared as follows: An aqueous slurry was prepared which contained 4344 g of aluminum chlorohydrol solution (23% solids), 3250 g (dry basis) of ferrierite, 650 g (dry basis) clay and enough additional water to make a slurry which contained about 40% solids. The slurry was milled in a Drais mill to an average particle size of less than 2.5 μm and then spray dried in a Bowen spray dryer. The spray-dried product was calcined for 1.5 hours at 593° C. The catalyst, with the properties as shown in Table 2, was designated as Additive I.

Example 10

Ferrierite was exchanged with zinc ions using a solid-state exchange procedure as follows: Zinc chloride (228 g) was ground into a fine powder and then blended with 2500 g of ferrierite powder. The blend was calcined for 2 hours at 325° C. The calcined blend was slurried into 9000 g of water maintained at 80° C., mixed for 0.16 hours and then filtered. The filter cake was then washed three times with water maintained at 80° C., dried and then calcined at 593° C. for 1.5 hours. The final zinc solid-state exchanged product contained 2.80% ZnO.

A composition comprising 65% Zn/ferrierite, 15% Clay and 20% Alumina Sol was prepared as follows: An aqueous slurry was prepared which contained 2608 g of aluminum chlorohydrol solution (23% solids), 1950 g (dry basis) of zinc solid state exchanged ferrierite and enough additional water to make a slurry which contained about 40% solids. The slurry was milled in a Drais mill to an average particle size of less than 2.5 µm and then spray dried in a Bowen spray dryer. The spray-dried product was calcined for 1.5 hours at 593° C. The catalyst was designated as Additive J and had the properties shown in Table 2 below.

Example 11

A Ferrierite catalyst bound with silica sol was prepared using the following procedure: An aqueous slurry containing 29% Ferrierite ($SiO_2/Al_2O_3=20$) was milled in a Drais mill. The milled Ferrierite slurry (4160 g) was combined with 1200 g Natka clay (dry basis) and 6000 g silica sol binder (10% solids). The silica sol binder was prepared from sodium silicate and acid alum. The catalyst slurry was then spray dried in a Bowen spray dryer. The resulting spray dried product was washed with ammonium sulfate solution, followed by water to give a catalyst with a $Na_2O$ level of less than 0.1 wt %. The catalyst was designated as Additive K and had the properties as shown in Table 2 below.

Example 12

Additive K, prepared in Example 11, was exchanged with zinc ions by the following process: The Zn-exchange was carried out by adding 150 g of the spray dried catalyst to a zinc nitrate solution containing 12.4 g of $Zn(NO_3)_2.6H_2O$ in 1500 g water. The mixture was stirred for 0.5 hours at 70° C. The slurry was then filtered and the catalyst washed three times with water maintained at 70° C. to remove the excess zinc nitrate. The catalyst was designated as Additive L and had the properties as shown in Table 2 below.

TABLE 2

Properties of Additives H through L

| | | Additive H | Additive I | Additive J | Additive K | Additive L |
|---|---|---|---|---|---|---|
| $SiO_2$ | % | 54.90 | 65.82 | 65.31 | 76.24 | 76.00 |
| $Al_2O_3$ | % | 33.79 | 32.97 | 31.82 | 21.68 | 21.55 |
| ZnO | % | 10.7 | — | 1.86 | — | 0.59 |
| $Na_2O$ | % | 0.09 | 0.08 | 0.05 | 0.05 | 0.03 |
| $RE_2O_3$ | % | 0.01 | 0.03 | 0.03 | 0.02 | 0.02 |
| $SO_4$ | % | 0.093 | 0.13 | 0.02 | 0.23 | 0.16 |
| Surface Area | $m^2/g$ | 86 | 265 | 233 | 206 | 209 |
| Zeolite | $m^2/g$ | 68 | 206 | 184 | 161 | 155 |

Example 13

Additives A through H were evaluated in the DCR to determine the effectiveness of the additives for the reduction of NO emissions released from an FCC unit. In each of the experiments, the DCR was operated under "full burn" regeneration conditions, where "full burn" is defined as the condition wherein the amount of air added to the regenerator is sufficient to convert all the coke species on the spent FCC catalyst to $CO_2$. The testing was performed with 1% excess $O_2$ in the regenerator, and with the regenerator operating at 705° C.

A commercial FCC feed having the properties as shown in Table 3 below was used for testing. The DCR was charged initially with a blend of approximately 1596 g of an equilibrium cracking catalyst having the properties as shown in Table 4 and 4 g of a commercial sample of a Pt-based combustion promoter (CP®-3, obtained from Grace Davison), which had been deactivated for 20 hours at 788° C. without any added Ni or V using the Cyclic Propylene Steaming method (CPS). The description of the CPS method has been published in L. T. Boock, T. F. Petti, and J. A Rudesill, "Contaminant-Metal Deactivation and Metal-Dehydrogenation Effects During Cyclic Propylene Steaming of Fluid Catalytic Cracking Catalysts," Deactivation and Testing of Hydrocarbon Processing Catalysts, ACS Symposium Series 634, p. 171 (1996), ISBN 0-8412-3411-6.

After stabilization of the unit, the baseline NO emissions data were collected using an on-line Multigas 2030 FTIR gas analyzer. Subsequently a second blend containing the additive was injected into the DCR. For Additives A, E, F, G and H, this blend contained approximately 86 g of the additive that had been hydrothermally deactivated in a fluidized bed reactor with 20% steam in $N_2$ for 24 hours at 760° C. without the addition of Ni or V and 0.215 g of the CPS-deactivated CP®-3. For Additives B, C and D, this blend contained approximately 90 g of the additive that had been hydrothermally deactivated in a fluidized bed reactor with 20% steam in $N_2$ for 24 hours at 760° C. without the addition of Ni or V, 109.5 g of the equilibrium cracking catalyst and 0.25 g of the CPS-deactivated CP®-3. As observed in Table 5, Additives B through H show better $NO_x$ reduction performance in the DCR than Additive A at similar amounts. This confirms that the addition of Zn to ferrierite improves its $NO_x$ reduction performance after deactivation. The $NO_x$ reduction performance increases with increasing Zn levels until a maximum is reached in the 10% ZnO range.

The yields for the runs with Additives A, E and F are shown in Table 6 below to illustrate the point that none of these $NO_x$ reduction additives affect FCC yields.

TABLE 3

Properties of Feed Used in DCR Tests for the Evaluation of Additives A-J

| API Gravity @60 F. | 25.5 |
|---|---|
| Sulfur, wt. % | 0.369 |
| Total Nitrogen, wt. % | 0.12 |
| Basic Nitrogen, wt. % | 0.05 |
| Conradson Carbon, wt. % | 0.68 |
| K Factor | 11.94 |
| Refractive Index | 1.503 |
| Simulated Distillation, vol. %, ° F. | |
| 10 | 607 |
| 20 | 691 |
| 40 | 782 |
| 60 | 859 |
| 80 | 959 |
| FBP | 1257 |

TABLE 4

Properties of equilibrium cracking catalyst used in DCR evaluation of Additives A-J and M-T

| $SiO_2$ | wt % | 49.01 |
|---|---|---|
| $Al_2O_3$ | wt % | 46.05 |
| $RE_2O_3$ | wt % | 1.44 |
| $Na_2O$ | wt % | 0.32 |
| $TiO_2$ | wt % | 1.16 |
| CaO | wt % | 0.14 |
| Ni | ppm | 1060 |
| V | ppm | 1760 |
| Sb | ppm | 270 |
| SA | $m^2/g$ | 174 |
| Zeolite | $m^2/g$ | 127 |

TABLE 5

$NO_x$ reduction performance of Additives A-H

| Sample | Additive level (wt. %) | NO emissions with equilibrium catalyst/0.25% CP ®-3 ppm | NO emissions with Additive after 2 hours on-stream ppm | NO reduction (%) |
|---|---|---|---|---|
| Additive A | 5.1 | 169 | 144 | 15 |
| Additive B | 5.0 | 248 | 154 | 38 |
| Additive C | 5.0 | 241 | 123 | 49 |
| Additive D | 5.0 | 265 | 128 | 52 |
| Additive E | 5.1 | 181 | 65 | 64 |
| Additive F | 5.1 | 187 | 57 | 70 |
| Additive G | 5.1 | 178 | 111 | 38 |
| Additive H | 5.1 | 184 | 58 | 68 |

TABLE 6

Hydrocarbon Yields for Additives A, E and F

|  | E-Cat + CP-3 Average | Stdev | Additive F | Additive E | Additive A |
|---|---|---|---|---|---|
| Conversion wt % | 75.14 | 0.53 | 74.85 | 75.26 | 75.64 |
| Cat./Oil Ratio | 9.31 | 0.11 | 9.15 | 9.22 | 9.34 |

TABLE 6-continued

Hydrocarbon Yields for Additives A, E and F

|  | E-Cat + CP-3 Average | Stdev | Additive F | Additive E | Additive A |
|---|---|---|---|---|---|
| $H_2$ Yield wt % | 0.11 | 0.01 | 0.12 | 0.12 | 0.11 |
| C1 + C2's wt % | 2.09 | 0.08 | 2.15 | 2.10 | 2.17 |
| Total C3 wt % | 5.82 | 0.19 | 6.00 | 5.83 | 5.92 |
| C3 wt % | 0.77 | 0.03 | 0.76 | 0.76 | 0.78 |
| C3= wt % | 5.05 | 0.16 | 5.23 | 5.07 | 5.14 |
| Total C4 wt % | 9.91 | 0.37 | 10.01 | 10.25 | 10.38 |
| Total C4= wt % | 6.48 | 0.28 | 6.71 | 6.85 | 6.93 |
| Gasoline wt % | 53.13 | 0.40 | 52.54 | 53.06 | 52.96 |
| Gasoline Paraffins wt % | 3.61 | 0.05 | 3.57 | 3.59 | 3.62 |
| Gasoline IsoParaffins wt % | 24.58 | 0.62 | 23.61 | 24.98 | 24.59 |
| Gasoline Aromatics wt % | 30.88 | 0.68 | 31.28 | 29.96 | 30.12 |
| Gasoline Naphthenes wt % | 11.01 | 0.24 | 10.73 | 10.68 | 10.89 |
| Gasoline Olefins wt % | 29.92 | 0.43 | 30.81 | 30.78 | 30.79 |
| Research Octane Number | 92.07 | 0.16 | 92.38 | 92.19 | 92.25 |
| Motor Octane Number | 79.51 | 0.13 | 79.55 | 79.54 | 79.60 |
| LCO wt % | 19.41 | 0.39 | 19.50 | 19.28 | 19.03 |
| Bottoms wt % | 5.45 | 0.16 | 5.65 | 5.46 | 5.34 |
| Coke wt % | 3.99 | 0.10 | 3.91 | 3.77 | 3.97 |

Example 14

Additives I and J were evaluated for the reduction of $NO_x$ emissions from an FCC unit in the DCR. The testing was performed with the DCR operating under the same conditions, equilibrium catalyst and feed as in Example 13. The DCR was charged initially with a blend of approximately 1895.25 g of the equilibrium cracking catalyst and 4.75 g of CPS-deactivated CP®-3. After stabilization of the unit, the baseline NO emissions data were collected using an on-line Multigas 2030 FTIR gas analyzer. Subsequently a blend of approximately 105 g of Additive I or J, 94.5 g of the equilibrium catalyst and 0.5 g of the CPS-deactivated CP®-3 was injected into the DCR and the run was continued for approximately 10 hours on the additive. As shown in Table 7, Additive J was only slightly more effective in reducing $NO_x$ emissions than Additive I after 1 hour but shows a bigger $NO_x$ reduction performance advantage after 7 hours. From this data, it can be concluded that the addition of pre-exchanged Zn to ferrierite stabilizes the $NO_x$ reduction activity and provides improved $NO_x$ reduction performance as compared to the non stabilized additive.

TABLE 7

NO reduction performance of Additives I and J in the DCR

| Sample | Additive level (wt. %) | NO emissions with equilibrium catalyst/0.25% CP ®-3 (ppm) | NO emissions with Additive after 1 hour on-stream (ppm) | 1 hour on-stream NO Reduction (%) | NO emissions with Additive after 7 hours on-stream (ppm) | 7 hour on-stream NO Reduction (%) |
|---|---|---|---|---|---|---|
| Additive I | 5 | 173 | 36 | 79 | 75 | 57 |
| Additive J | 5 | 180 | 34 | 81 | 59 | 67 |

Example 15

Additives K and L were evaluated for their $NO_x$ reduction performance in the DCR using the same operating conditions as in Examples 13 and 14. A commercial FCC feed was used for testing and its properties are shown in Table 8 below. The DCR was charged initially with a blend of approximately 1800 g of a commercially available cracking catalyst, SUPERNOVA® DMR+ obtained from Grace Davison hydrothermally deactivated in a fluidized bed reactor with 100% steam for 4 hours at 816° C. without the addition of Ni or V. After stabilization of the unit, the baseline NO emissions data were collected using an on-line Lear-Siegler $SO_2$/NO Analyzer (SM8100A). Subsequently, a blend of 100 g of catalyst was added to the DCR consisting of 95.25 g of the hydrothermally deactivated SuperNova® DMR+ catalyst and 4.75 g of the CPS-CP®-3. NO emissions were continuously collected through out this time frame and once the unit was again stabilized, a blend containing 0.525 g of the deactivated CP-3® with 105 g of Additive K or L and 105 g of the deactivated SuperNova® DMR+ catalyst was added to the DCR. As observed in Table 9, Additive L is better at reducing NO emissions from the DCR than the Additive K. This shows that post-exchange of Zn onto ferrierite contained in a particle with a silica sol binder improves the NO reduction performance of ferrierite.

TABLE 8

Properties of the feed used in DCR tests for the evaluation of Additives K and L.

| | |
|---|---|
| API Gravity @ 60° F. | 23.2 |
| Sulfur, wt. % | 0.023 |
| Total Nitrogen, wt. % | 0.13 |
| Basic Nitrogen, wt. % | 0.04 |
| Conradson Carbon, wt. % | 0.03 |
| K Factor | 11.4 |
| Simulated Distillation, vol. %, ° F. | |
| 5 | 453 |
| 20 | 576 |
| 40 | 660 |
| 60 | 743 |
| 80 | 838 |
| FBP | 1153 |

TABLE 9

NO reduction performance of Additives K and L in the DCR.

| Sample | Additive level (wt. %) | Average NO emissions with catalyst/ CP-3 added (ppm) | NO emissions after 2 hours on stream (ppm) | NO reduction (%) |
|---|---|---|---|---|
| Additive K | 5.0 | 276 | 114 | 59 |
| Additive L | 5.0 | 279 | 84 | 70 |

Example 16

A composition comprising 75% clay and 25% alumina sol was prepared as follows: An aqueous slurry was prepared that contained 2174 g of aluminum chlorohydrol solution (23% solids), 1500 g (dry basis) of clay and enough additional water to make a slurry which contained about 40% solids. The slurry was milled in a Drais mill to an average particle size of less than 2.5 μm and then spray dried in a Bowen spray dryer. The spray-dried product was calcined for 1.5 hours at 593° C. The catalyst was designated as Additive M and had the properties as shown in Table 10 below.

Example 17

A composition comprising 71% clay, 6% ZnO and 23% alumina sol was prepared as follows: An aqueous slurry was prepared that contained 6520 g of aluminum chlorohydrol solution (23% solids), 4500 g (dry basis) of clay, 620 g $ZnCl_2$ and enough additional water to make a slurry which contained about 45% solids. The slurry was milled in a Drais mill to an average particle size of less than 2.5 μm and then spray dried in a Bowen spray dryer. The spray-dried product was calcined for 1.5 hours at 593° C. The catalyst was designated as Additive N amd had the properties as shown in Table 10 below.

Example 18

ZnO supported on alumina was prepared as follows: 1000 g (dry basis) of HiQ alumina (obtained from Alcoa) was impregnated, to incipient wetness, with 165 g $ZnCl_2$ dissolved in water. The material was then calcined for 2 hours at 593° C. The catalyst was designated Additive O and had the properties as shown in Table 10 below.

Example 19

In order to simulate the pick-up of $SiO_2$ and sodium ions of the ZnO/alumina catalyst during deactivation in an FCC unit, the catalyst was impregnated first with a $SiO_2$ compound and then with sodium salt. 500 g (dry basis) Additive O was impregnated, to incipient wetness, with 85 g tetraethylorthosilicate dissolved in ethanol. The catalyst was dried at room temperature overnight and then impregnated with an aqueous solution containing 4.3 g of sodium carbonate. The material was then calcined for 2 hours at 593° C. Subsequently, this sample was subjected to hydrothermal deactivation in a fluidized bed reactor for 4 hours at 816° C. with 100% steam. The catalyst was designated Additive P and had the properties as shown in Table 10 below.

TABLE 10

Properties of Additives M through P

| | | Additive M | Additive N | Additive O | Additive P |
|---|---|---|---|---|---|
| $Al_2O_3$ | wt. % | 56.18 | 54.00 | 87.90 | 82.5 |
| $SiO_2$ | wt. % | 42.07 | 40.97 | 0.34 | 5.1 |
| ZnO | wt. % | 0.04 | 5.11 | 11.77 | 10.79 |
| $Na_2O$ | wt. % | 0.08 | 0.10 | 0.02 | 0.44 |
| $Fe_2O_3$ | wt. % | 1.40 | 1.31 | — | 0.03 |
| $SO_4$ | wt. % | — | 0.02 | 0.14 | — |
| Surface Area | $m^2/g$ | 52 | 60 | 142 | 117 |

Example 20

The performance of HiQ $Al_2O_3$ and Additives M through P for reduction of NO emissions were evaluated in the DCR using the same conditions, feed and catalyst as shown in Examples 13 and 14. The DCR was initially charged with a blend of 1596 g of the equilibrium cracking catalyst and 4 g of CPS-deactivated CP®-3. Upon stabilization of the unit, a blend of 85.12 g of the additive and 0.215 g of deactivated CP®-3 was charged to the DCR and the run was continued for approximately 2 hours on each additive. Results were recorded in Table 11 below.

As shown in Table 11, it can be inferred that addition of ZnO to different supports does not improve their $NO_x$ reduction activity in the DCR, meaning that the intrinsic $NO_x$ reduction activity of Zn is very low under realistic FCC conditions. This data shows that the increased $NO_x$ reduction activity observed with the addition of Zn to ferrierite in Examples 13 and 14 is primarily due to the stabilizing effect of Zn on ferrierite.

TABLE 11

NO reduction performance of Additives M through P in the DCR

| Sample | Additive level (wt. %) | NO emissions with equilibrium catalyst/0.25% CP-3 ppm | NO emissions with Additive after 2 hours on-stream ppm | NO reduction (%) |
|---|---|---|---|---|
| Additive M | 5.1 | 199 | 156 | 22 |
| Additive N | 5.1 | 257 | 198 | 23 |
| Additive O | 5.1 | 186 | 56 | 70 |
| Additive P | 5.1 | 157 | 139 | 11 |
| HiQ $Al_2O_3$ | 5.1 | 194 | 59 | 70 |

Example 21

A composition comprising 75% ferrierite, 25% Alumina sol was prepared as described in Example 1. The spray dried product was calcined 1.5 hours at 593° C. About 125 g of this material was subsequently impregnated with 17.7 g of $YCl_3 \cdot 6H_2O$ dissolved in 100 ml deionized water, oven dried at 287° C. overnight and then calcined for 2 hours at 538° C. The resulting sample was designated as Additive Q and had the properties as shown in Table 12 below.

Example 22

A composition comprising 75% Ferrierite, 25% Alumina sol was prepared as described in Example 1. The spray dried product was calcined 1.5 hours at 593° C. About 125 g of this material was subsequently impregnated with 33.2 g of $MgCl_2 \cdot 6H_2O$ dissolved in 87 ml deionized water; oven dried at 287° C. overnight, and then calcined for 2 hours at 593° C. The resulting sample was designated as Additive R and had the properties as shown in Table 12 below.

Example 23

A composition comprising 73% ferrierite, 3% $Fe_2O_3$ and 24% Alumina Sol was prepared as follows: An aqueous slurry was prepared which contained 6520 g of aluminum chlorohydrol solution (23% solids), 4500 g (dry basis) of ferrierite ($SiO_2/Al_2O_3$=20, $Na_2O+K_2O$<0.5 wt %), 445 g of $FeCl_2 \cdot 4H_2O$ and enough additional water to make a slurry that contained about 44% solids. The slurry was milled in a Drais mill to an average particle size of less than 2.5 µm and then spray dried in a Bowen spray dryer. The spray-dried product was calcined for 1.5 hours at 593° C. The catalyst was designated as Additive S and had the properties as shown in Table 12 below.

Example 24

A composition comprising 67% ferrierite, 11% $Fe_2O_3$ and 22% Alumina Sol was prepared as follows: An aqueous slurry was prepared which contained 6520 g of aluminum chlorohydrol solution (23% solids), 4500 g (dry basis) of ferrierite ($SiO_2/Al_2O_3$=20, $Na_2O+K_2O$<0.5 wt %), 1782 g of $FeCl_2 \cdot 4H_2O$ and enough additional water to make a slurry that contained about 44% solids. The slurry was milled in a Drais mill to an average particle size of less than 2.5 µm and then spray dried in a Bowen spray dryer. The spray-dried product was calcined for 1.5 hours at 593° C. The catalyst was designated as Additive T and had the properties as shown in Table 12 below.

TABLE 12

Properties of Additives Q through T.

|  |  | Additive Q | Additive R | Additive S | Additive T |
|---|---|---|---|---|---|
| $SiO_2$ by difference | Wt. % | 62.42 | 61.88 | 66.74 | 58.24 |
| $Al_2O_3$ | Wt. % | 30.20 | 30.60 | 29.57 | 30.20 |
| $Fe_2O_3$ | Wt. % | — | — | 2.99 | 10.92 |
| MgO | Wt. % | — | 4.78 | — | 0.06 |
| $Y_2O_3$ | Wt. % | 4.79 | — | — | — |
| $Na_2O$ | Wt. % | 0.08 | 0.08 | 0.06 | 0.09 |
| $K_2O$ | Wt. % | 0.37 | 0.33 | 0.16 | 0.09 |
| $SO_4$ | Wt. % | 1.86 | 1.75 | 0.29 | 0.16 |
| Total Surface area | $m^2/g$ | 307 | 256 | 277 | 228 |
| Zeolite Surface area | $m^2/g$ | 226 | 174 | 22 | 139 |
| Deactivated properties: (24 hours/760° C./20% steam) | | | | | |
| Total Surface area | $m^2/g$ | 284 | 244 | 278 | 256 |
| Zeolite Surface area | $m^2/g$ | 197 | 171 | 210 | 184 |

Example 25

The performance of Additives Q through T was evaluated for the reduction of NO emissions in the DCR using the same conditions, feed and catalyst as shown in Example 13. The DCR was initially charged with a blend of 1596 g of the equilibrium cracking catalyst, and 4 g of CPS-deactivated CP®-3. Upon stabilization of the unit, a blend of 85.12 g of Additive Q or R or S that had been hydrothermally deactivated in a fluidized bed reactor with 20% steam in $N_2$ for 24 hours at 760° C. without the addition of Ni or V, and 0.215 g of deactivated CP-3® was charged to the DCR and the run was continued for approximately 2 h on each on additive. For the evaluation of Additive T, the second blend contained 85 g of the hydrothermally deactivated additive, 14.75 g of the equilibrium catalyst and 0.25 g of deactivated CP-3®. As can be inferred from Table 13, at constant moles of the stabilizing metal, Zn and Fe exhibited similar $NO_x$ reduction performance on ferrierite and showed improved $NO_x$ reduction performance over either Mg or Y in stabilized ferrierite.

TABLE 13

NO reduction performance of Additives C, F, R, S, T and V in the DCR at constant moles of stabilizing metal ion

| Sample | Additive level (wt. %) | Stabilizing cation | Mole % of metal ion | NO emissions with equilibrium catalyst/ 0.25% CP-3 ppm | Steady state NO emissions with Additive ppm | NO reduction (%) |
|---|---|---|---|---|---|---|
| Additive C | 5.1 | Zn | 0.05 | 241 | 123 | 49 |
| Additive Q | 5.1 | Y | 0.04 | 172 | 136 | 21 |
| Additive S | 5.1 | Fe | 0.04 | 182 | 98 | 46 |
| Additive F | 5.1 | Zn | 0.13 | 187 | 57 | 70 |
| Additive R | 5.1 | Mg | 0.13 | 203 | 178 | 13 |
| Additive T | 5.0 | Fe | 0.13 | 233 | 104 | 55 |

What is claimed is:

1. An improved process of reducing $NO_x$ emissions from the regeneration zone of a fluid catalytic cracking unit (FCCU) during fluid catalytic cracking (FCC) of a hydrocarbon feedstock into lower molecular weight components, said process comprising
    a) contacting a hydrocarbon feedstock with a circulating inventory of an FCC cracking catalyst which comprises a Y-type zeolite in a FCCU in the presence of an effective $NO_x$ reducing amount of a particulate $NO_x$ reduction composition having a mean particle size of greater than 4.5 μm and consisting essentially of at least about 30 weight percent of a $NO_x$ reducing zeolite having a pore size ranging from about 2 to about 7.2 Angstroms and a $SiO_2$ to $Al_2O_3$ molar ratio of less than about 500, said zeolite being stabilized with a stabilizing amount of a metal or metal ion selected from the group consisting of zinc, iron and combinations thereof, from about 10 to about 30 weight percent of an inorganic binder, and optionally, no more than 70 wt % of at least one additional material selected from the group consisting of a filler, a matrix material and combinations thereof, wherein the particulate $NO_x$ reduction composition is present as a separate particulate additive and wherein and the amount of the $NO_x$ reduction composition in the catalyst inventory is that amount sufficient to provide a ratio of $NO_x$ reducing zeolite component to Y-type zeolite in the total catalyst inventory of less than 1; and
    b) reducing the amount of $NO_x$ emissions released from the regeneration zone of the FCCU as compared to the amount of $NO_x$ emissions released in the absence of the $NO_x$ reduction composition.

2. The process of claim 1 wherein step (b) is accomplished without a substantial change in the hydrocarbon feedstock conversion or yield of cracked hydrocarbons as compared to the hydrocarbon feedstock conversion or yield of cracked hydrocarbons obtained from the cracking catalyst alone.

3. The process of claim 1 or 2 further comprising recovering the cracking catalyst from said contacting step and treating the used catalyst in a regeneration zone to regenerate said catalyst.

4. The process of claim 1 or 2 wherein the cracking catalyst and the particulate $NO_x$ reduction composition are fluidized during contacting said hydrocarbon feedstock.

5. The process of claim 1 wherein the $NO_x$ reducing zeolite is selected from the group consisting of ferrierite, ZSM-11, beta, MCM-49, mordenite, MCM-56, Zeolite-L, zeolite Rho, erionite, chabazite, clinoptilolite, MCM-22, MCM-35, MCM-61, Offretite, A, ZSM-12, ZSM-23, ZSM-18, ZSM-22, ZSM-57, ZSM-61, ZK-5, NaJ, Nu-87, Cit-1, SSZ-35, SSZ-48, SSZ-44, SSZ-23, Dachiardite, Merlinoite, Lovdarite, Levyne, Laumontite, Epistilbite, Gmelinite, Gismondine, Cancrinite, Brewsterite, Stilbite, Paulingite, Goosecreekite, Natrolite, omega and combinations thereof.

6. The process of claim 5 wherein the $NO_x$ reducing zeolite is selected from the group consisting of ferrierite, beta, MCM-49, mordenite, MCM-56, Zeolite-L, zeolite Rho, erionite, chabazite, clinoptilolite, MCM-22, Offretite, A, ZSM-12, ZSM-23, omega and combinations thereof.

7. The process of claim 6 wherein the $NO_x$ reducing zeolite is ferrierite.

8. The process of claim 7 wherein the $NO_x$ reducing zeolite is stabilized with zinc metal or zinc ions.

9. The process of claim 1 wherein the filler is clay.

10. The process of claim 1 wherein the $NO_x$ reduction composition has a mean particle size from about 50 to about 200 μm.

11. The process of claim 10 wherein the particulate $NO_x$ reduction composition has a mean particle size from about 55 to about 150 μm.

12. The process of claim 1 wherein the amount of the $NO_x$ reducing zeolite present in the $NO_x$ reduction composition is at least 40 weight percent of the composition.

13. The process of claim 12 wherein the amount of the $NO_x$ reducing zeolite present in the $NO_x$ reduction composition is at least 50 weight percent of the composition.

14. The process of claim 1 wherein the amount of the $NO_x$ reducing zeolite present in the $NO_x$ reduction composition ranges from about 30 to about 80 weight percent of the composition.

15. The process of claim 14 wherein the amount of the $NO_x$ reducing zeolite present in the $NO_x$ reduction composition ranges from about 40 to about 75 weight percent of the composition.

16. The process of claim 1 wherein the inorganic binder comprises alumina, silica, silica-alumina, aluminum phosphate or combinations thereof.

17. The process of claim 16 wherein the inorganic binder is an acid or base peptized alumina.

18. The process of claim 1 or 17 further comprising contacting the hydrocarbon feed with at least one additional $NO_x$ reduction composition.

19. The process of claim 16 wherein the alumina is aluminum chlorohydrol.

20. The process of claim 1 wherein the amount of inorganic binder present in the $NO_x$ reduction composition ranges from about 15 to about 25 weight percent of the composition.

21. The process of claim 1 wherein the $NO_x$ reducing zeolite component has a $SiO_2$ to $Al_2O_3$ molar ratio of less than 250.

22. The process of claim 1 wherein the matrix material is selected from the group consisting of alumina, silica, silica-alumina, titania, zirconia, yttria, lanthana, ceria, neodymia, samaria, europia, gadolinia, praseodymia, and mixtures thereof.

23. The process of claim 1 wherein the particulate $NO_x$ reduction composition has a Davison attrition index (DI) value of less than 50.

24. The process of claim 23 wherein the particulate $NO_x$ reduction composition has a DI value of less than 20.

25. The process of claim 24 wherein the particulate $NO_x$ reduction composition has a DI value of less than 15.

26. The process of claim 1 wherein the $NO_x$ reducing zeolite is stabilized with zinc metal or zinc ions.

* * * * *